Sept. 13, 1949.  M. G. BROWN  2,481,567
INSTRUMENT FOR HEMOGLOBIN DETERMINATION
HAVING TWO FILTERS TO MATCH THE
SPECTRAL CURVE OF OXYHEMOGLOBIN
Filed Dec. 26, 1945  5 Sheets-Sheet 1
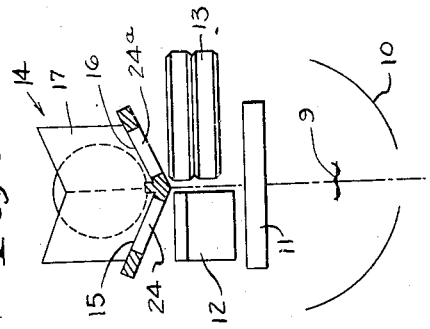
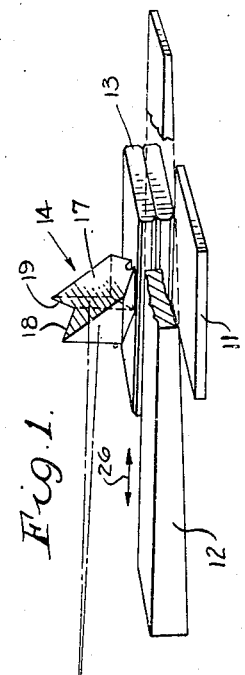
INVENTOR.
MORDEN G. BROWN
BY Herbert C. Kimball
ATTORNEY

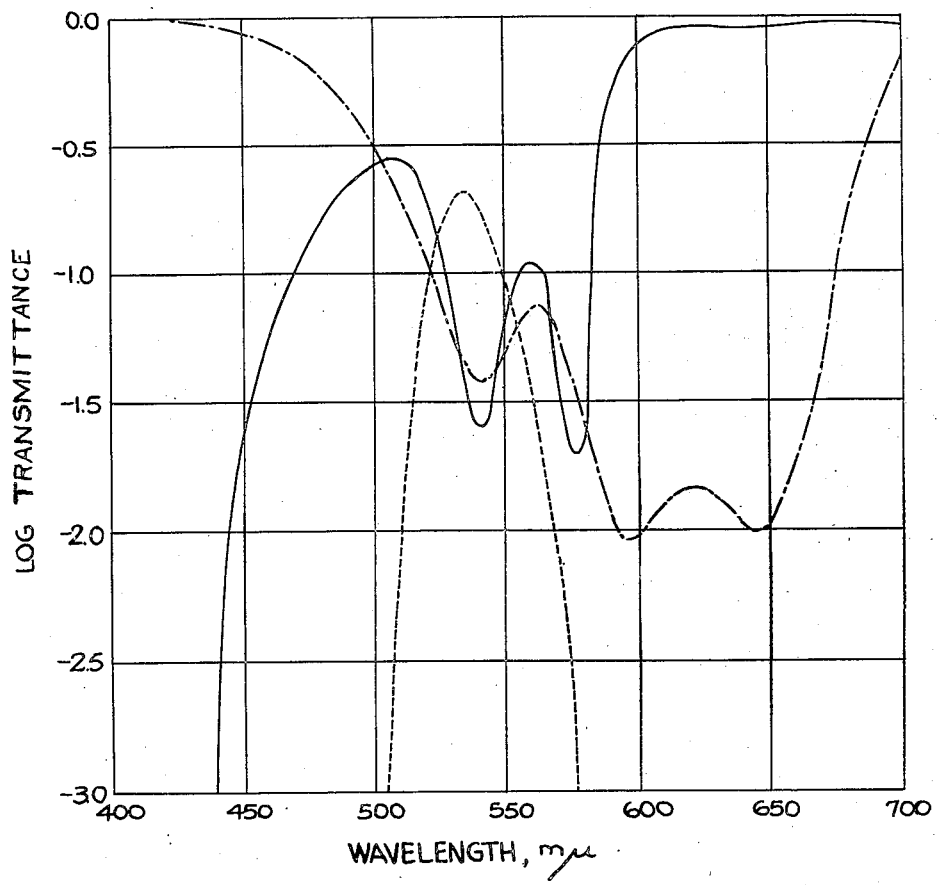

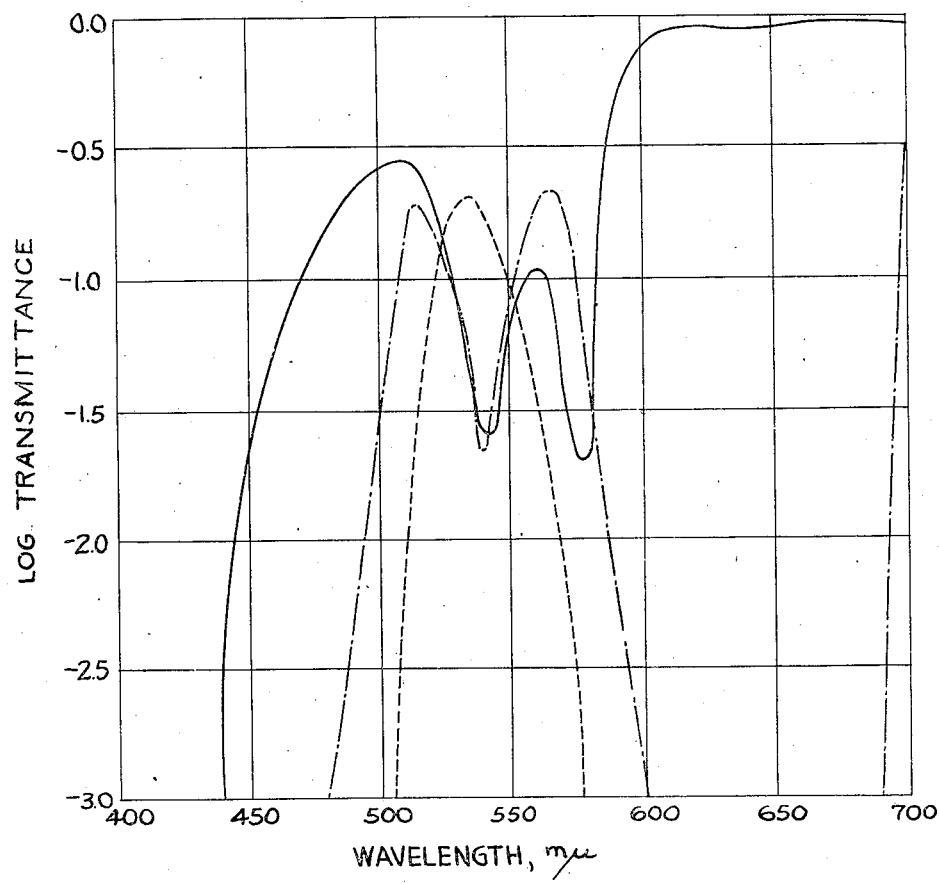

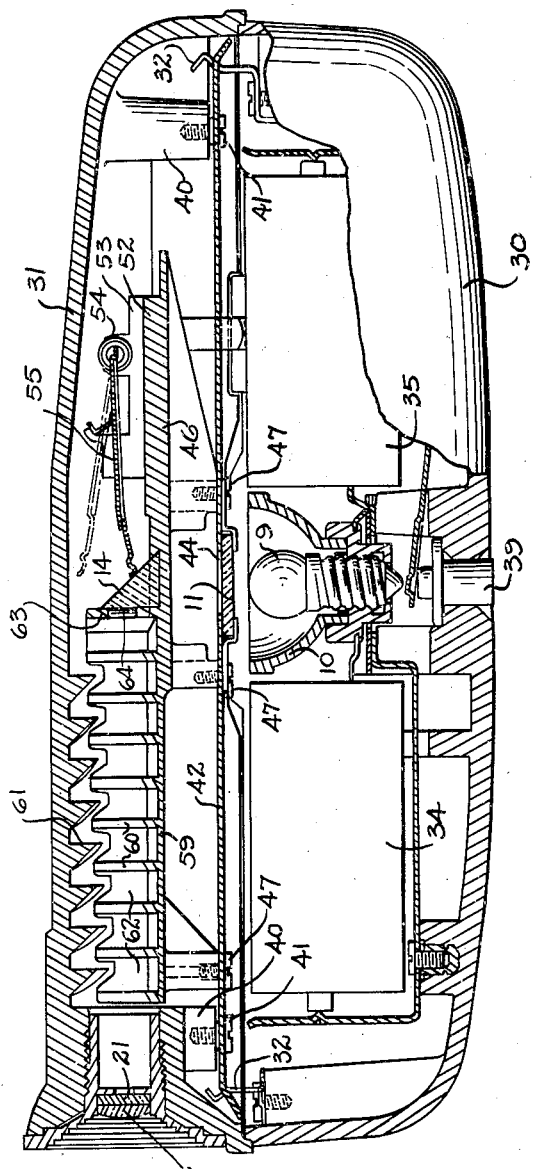
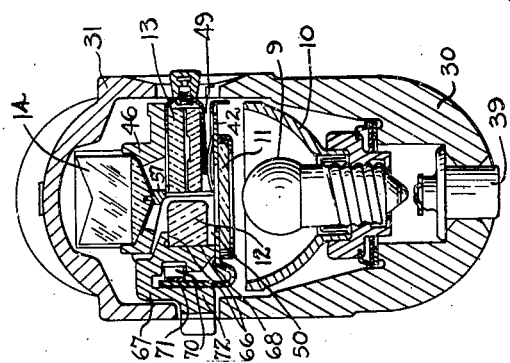

Patented Sept. 13, 1949

2,481,567

UNITED STATES PATENT OFFICE 2,481,567

INSTRUMENT FOR HEMOGLOBIN DETERMINATION HAVING TWO FILTERS TO MATCH THE SPECTRAL CURVE OF OXYHEMOGLOBIN

Morden G. Brown, Williamsville, N. Y., assignor to American Optical Company, Southbridge, Mass., a voluntary association of Massachusetts Application December 26, 1945, Serial No. 637,229

8 Claims. (Cl. 88—14)

This invention relates to an instrument for accurate determination of hemoglobin in the blood.

One of the primary functions of the blood is to transport oxygen from the lungs to all tissues of the body. This vitally important oxygen carrying capacity is best measured by measurement of the concentration of the red pigment, hemoglobin, with which the oxygen is loosely combined during transport.

It has been found advantageous to measure hemoglobin concentration by colorimetric methods. Generally such a determination is not made with the blood as drawn from the patient; but instead the sample used is some derivative such as oxyhemoglobin, carbon-monoxide hemoglobin, acid hematin, pyridine hemochromogen, or cyanmethmoglobin. Although the most convenient of these derivatives to use is oxyhemoglobin (due to the fact that this compound is formed upon simple exposure to air), the other derivatives have been widely used. One reason for use of these other less convenient derivatives is that it has been found difficult to match the oxyhemoglobin sample by a permanent standard. I believe that this difficulty is due to the fact that the absorption spectra of oxyhemoglobin is very irregular. The standard, such as a glass standard, has generally been characterized by spectrophotometric curves which are different from those for oxyhemoglobin. In other words, the observer is attempting to compare two illuminated areas which do not transmit equally in the same portions of the spectrum. The observer is therefore calling upon his retina to evaluate colors. It is well known that observers vary in sensitivity to red and green light. Since it is the ratio of the amounts of red and green light which largely determines the apparent color of blood, considerable variations in settings have been found by different observers when making color matches between blood and the glass used as a standard of comparison.

Accordingly, an object of my invention is to provide an instrument in accordance with which determination of the concentration of oxyhemoglobin is arrived at thru comparison of the brightness of a standard with the brightness of the sample of oxyhemoglobin.

In accordance with the present invention, the errors due to the above mentioned color vision characteristics have been overcome by selecting for a standard a glass which, in a portion at least of the spectrum, does not substantially deviate in its spectral curve from the spectral curve of oxyhemoglobin, and by limiting the light transmitted to the observer's eye to the above mentioned portion of the spectrum. Moreover, the portion of the spectrum selected includes the yellow and green where the sensitivity of the eye is the greatest.

This results in making it possible to arrange side by side for comparison by the observer two patches of light which do not vary substantially from each other except in brightness. Therefore, the observer is merely called upon to determine whether these patches of light have equal brightness; and therefore the matching of the intensities or brightnesses is not subject to the handicap of a difference in color.

In the drawings which illustrate diagrammatically an optical system useful in carrying out the method which I have described, and in which an illustrative form of instrument is shown:

Fig. 1 is a perspective view of such an optical system;

Fig. 2 is a side view of the optical system;

Fig. 3 is an end view thereof taken from the right side of Fig. 2;

Fig. 4 is a graph showing the absorption curve of oxyhemoglobin superimposed on the absorption curve of a typical glass which I use in accordance with my invention;

Fig. 5 is a similar graph showing the absorption curve of oxyhemoglobin superimposed on the absorption curve of a different glass which I use in accordance with my invention;

Fig. 7 is a longitudinal central section through a form of instrument for determining the concentration of oxyhemoglobin in accordance with my invention;

Fig. 8 is a central transverse section of the instrument shown in Fig. 7.

Figure 6:
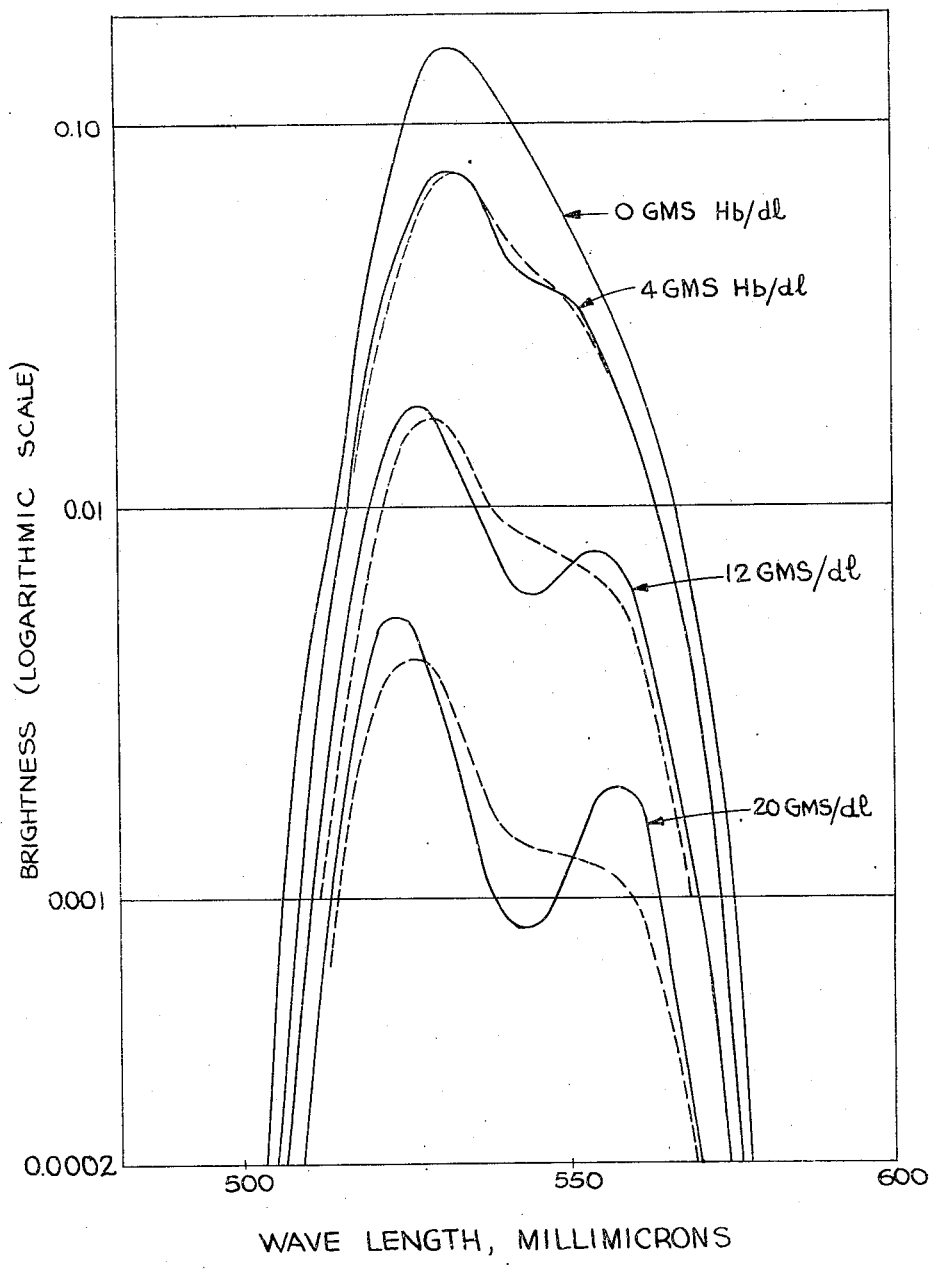
Fig. 6 is a graph showing the absorption curves of Fig. 4 as modified by a filter of the type that I employ, by the color sensitivity of the eye, and by the emission characteristics of the lamp.

My invention may be embodied in instruments of various construction having a blood chamber and a standard arranged to be viewed simultaneously by the observer, so that a comparison between the intensities of the two may be found. Then by a variation in the thickness of one of the two relative to the other, matching of intensity is attained and a reading found. Such instruments are known in which the thickness of the blood chamber is varied. It is more convenient, however, to make the standard in the form of an optical wedge so as to vary the intensity of the standard relative to the intensity of the sample of oxyhemoglobin.

An instrument of the latter character is illustrated in the patent of Gradisar and Brown, 2,396,260 granted March 12, 1946. The principle of an instrument of this character will now be explained in connection with Figs. 1, 2, and 3 of the accompanying drawing. A light source shown diagrammatically at 9 (Fig. 3) in cooperation with a reflector 10 evenly illuminates a diffusing plate 11. This plate 11 is sufficiently diffusing as to act as a secondary source of illumination.

The standard 12, which in this instrument is in the form of a wedge of glass, is arranged closely adjacent the blood chamber 13. Both of these are illuminated by the diffusing plate 11. For reasons of compactness, the intensities of the two are viewed by means of a reflector; this reflector preferably taking the form of a bi-prism 14 which deviates the light received from the standard and specimen respectively into the viewing means 20. The patches of light observed thru the viewing means 20 should be separated by a line of unperceived width; and this is accomplished by the bi-prism 14, since the entrance surfaces 15 and 16 are angularly related so as to deviate toward each other the two fields or areas of brightness to be matched. Moreover, after being reflected by the surface 17, these fields or areas are further deviated by the angularly related exit surfaces 18 and 19.

As above indicated, I introduce into this optical system a filter so as to limit the light viewed by the observer to a certain portion of the spectrum. While this filter may be introduced into the optical system at various points between the lamp 9 and the eyepiece, I find it somewhat advantageous to place the filter adjacent the eyepiece. In Fig. 2 is shown a filter 21 cooperating with an eyepiece lens 22. The power of this lens 22 is such as to bring into focus for the observer the apertures 24 and 24a for the wedge and specimen respectively, and more particularly the dividing line between these apertures.

As pointed out in the above identified patent, it is convenient to arrange the elongate wedge 12 for movement as indicated by the double headed arrow 26 parallel to the optical axis of the eyepiece lens 22 since this axis is the long dimension of the instrument. Moreover, the wedge is arranged beside the specimen holder or blood chamber 13 with its upper surface in the same plane as the specimen holder. One of the entrance surfaces of the bi-prism receives light from the standard and the other entrance surface receives light from the specimen.

An improved form of instrument for the observation of the juxtaposed patches of brightness, which is the subject of an application Serial No. 637,230, Morden G. Brown and Harry F. Lundberg filed December 26, 1945, is shown in Figures 7 and 8.

The casing or housing of the instrument is divided into two parts 30 and 31 detachably secured together by resilient clips 32. The part 30 is provided with a pair of cells 34 and 35 of the dry cell flashlight variety for supplying current to the electric lamp 9 provided with the reflector 10. The circuit including the battery of cells and the lamp is under control of push button 39.

The part 31 is provided adjacent opposite ends thereof with integral lugs 40 for receiving the screws 41 which serve to secure a partition 42 in place, this partition corresponding roughly to the dividing line between parts 30 and 31. The partition 42 is apertured adjacent its opposite ends to receive the bent ends of the resilient clips 32, and is provided with a central window 44 glazed with the diffusing plate 11.

A unitary frame member 46, preferably formed as a die casting, is mounted on the partition 42 and secured in place by screws 47. The frame member 46 is shaped to provide a central chamber 49 (see Fig. 8) at one side of the longitudinal vertical central plane of the instrument. In the chamber 49 may be positioned a specimen holder or blood chamber 13 containing a specimen which preferably has been first hemolized. This may, for example, be accomplished in the manner described in my application Serial No. 627,873, filed November 10, 1945. The frame member 46 is also shaped to provide, in conjunction with the partition 42, an elongated longitudinally disposed guideway 50 located at the opposite side of said central vertical plane. In the guideway 50 is positioned the wedge-shaped standard 12 for movement along the guideway as will further be explained.

The frame member 46 is also provided with a horizontal portion 52 which carries laterally spaced integral upstanding flanges 53 having bearings 54 formed therein for pivotally mounting a spring retainer 55. This spring retainer, when in lowered position, engages the bi-prism reflector 14 to resiliently press the reflector against its seat on the frame member 46. This seat is apertured (as shown in Fig. 8) and is in overlying relation to the standard 12 and blood chamber 13. The aperture in the seat is divided by a rib 57 (integral with member 46) which also closely fits a longitudinal slot in the prism.

The frame member 46 is also provided with an elongated forward portion 59 which is channel-shaped and provided with rills 60 to avoid reflections toward the observer. A similar non-reflecting wall portion 61 is formed upon the inside of the part 31 to cooperate with the channel-shaped portion 59 in providing a sighting tube 62 along which the observer may look in using the instrument. The sighting tube 62 has an end wall 63 integral with member 46 and provided with an aperture 64 aligned with the reflector 14. The observer sights along the tube 62 through the eyepiece lens 22 and filter 21.

The wedge-shaped standard 12 may be cemented or otherwise secured along the joints 66 to an elongated slide or carrier 67 which is arranged to fit within the guideway 50 and be guided at 68 upon the upper surface of the partition 42 so that it may be moved therealong when the device is in operation. An elongated spring 70 has its opposite ends positioned in a recess in the carrier 67 and its central portion bears against the inner surface of an upstanding flange 71 formed integrally along one side of the partition 42. An operating arm 72, extending laterally over the upper edge of the flange 71 and then downwardly to a position within an elongated opening or slot provided between the parts 30 and 31, has sliding engagement with the outer surface of the flange 71. This arm 72, together with the bearing surface 68 and spring 70, serves to yieldably and frictionally maintain the carrier 67 in any adjusted position, and allows the standard 12 to be moved longitudinally until a matching relation with the specimen in holder 13 has been obtained.

In order that the observer may compare intensities and may not be handicapped by having to evaluate differences in color, a standard 12 is employed which is made of a glass whose spectral curve matches closely the spectral curve of oxyhemoglobin in the portion of the spectrum transmitted by the filter 21. I have found that cobalt glass and uranium glass meet these requirements. By "cobalt glass" I mean a glass whose spectral curve is characterized by rapidly decreasing transmission with increasing wave length as 530 millimicrons is approached, an increase in transmission after passing 540 millimicrons up to about 565 millimicrons, and then a further rapid decrease in transmission. Generally this decrease continues to about 595 millimicrons, followed by somewhat of an increase in transmission followed by another decrease around 645 millimicrons, after which an increase in transmission occurs; but as is well known, not all cobalt glasses are made from the same ingredients; indeed, addition products are intentionally put in where it is desired to vary the absorption in certain portions of the spectrum such as in the red and blue portions of the spectrum, and therefore a "cobalt glass" as I use the term may have a spectral curve which does not exhibit true minimum and maximum at 595 and 645 millimicrons respectively. The minimum of transmission at about 540 millimicrons, the maximum at about 565 and the decrease toward about 595 are characteristic, while as above pointed out, variations in other portions of the spectrum are not material to my invention.

Fig. 4 shows in unbroken line the spectral curve of oxyhemoglobin, and in dot and dash line the spectral curve of a Corning Glass Works glass sold as #5551 (Cobalt Blue Glass). The spectral curve of a green filter (Modified Eastman Kodak Co. Wratten #74) is also shown in Fig. 4 to indicate which portions of the spectrum are prevented from reaching the observer's eye by this green filter. This is the green filter which I prefer to use at 21 as above explained. It will be noted that the yellow and green portions of the spectrum which are passed by the filter 21 correspond to the wavelengths of maximum sensitivity of the eye.

Fig. 6 shows for three concentrations, namely 4, 12 and 20 grams of oxyhemoglobin per deciliter at a thickness of 0.152 mm. and for zero absorption of either oxyhemoglobin or glass, the respective spectral curves for oxyhemoglobin and for the corresponding thickness of Corning Glass Works glass #5551 as modified by a green filter (Modified Eastman Kodak Co. Wratten #74), by the color sensitivity of the eye and by the emission characteristics of the lamp 9.

In Fig. 6, the spectral curves for the various concentrations of oxyhemoglobin as thus modified are shown in full lines and the modified spectral curves for glass #5551 are shown in dash lines.

Another glass which is equally suitable for the purposes of my invention, but which is not shown in the drawings, is sold by Kopp Glass Inc. as Electric Lunar White. Although the word "Cobalt" is not included in the name of this glass, its spectral curve which is quite similar to that of Corning Glass Works #5551 indicates that it contains cobalt, and in any event it is included within the term "Cobalt glass" as that term is employed herein.

A still further glass which is suitable for the purposes of my invention is uranium glass. A typical uranium glass has a spectral curve which is shown in Fig. 5. This glass is colored with uranous salt, and it will be noted that its spectral curve between 520 millimicrons and 580 millimicrons is quite similar to the spectral curve of oxyhemoglobin. By "uranium glass," as that term is used in the present specification and claims, I means a glass whose spectral curve is characterized by a maximum of transmission at about 520 millimicrons followed by a minimum of transmission at about 540 millimicrons followed by another maximum of transmission at about 565 millimicrons. The uranium glass whose spectral curve is shown is a melt under reducing conditions with an aluminum barium phosphate base, but other glasses which contain uranium and are characterized by the above specified maxima and minimum are suitable.

Both "cobalt" glass and "uranium" glass, it will be noted from Figs. 4 and 5, have an absorption curve closely approximating the absorption curve of oxyhemoglobin except in the portion of the spectrum of longer wavelength than about 570 millimicrons and shorter than about 510 millimicrons. These outer portions of the spectrum are substantially eliminated by the filter 21, for which purpose I prefer to use a green filter which has low transmission in the portion of the spectrum of shorter wavelength than 510 millimicrons and longer wavelength than 570 millimicrons. A gelatin filter suitable for this purpose is manufactured by Eastman Kodak Co. as Modified Wratten #74. An equivalent is a combination of Wratten #15 with Wratten #44.

Accordingly, by combining with a standard of the above type which has a spectral curve closely approximating the spectral curve of oxyhemoglobin in the yellow and green portions of the spectrum a filter which eliminates the remaining portions of the spectrum, I provide an improved method of determining the oxyhemoglobin concentration in a specimen; since the observer compares intensities, and is not subject to the difficulties arising out of his personal color vision characteristics. An instrument embodying the principle of my invention has the important advantage that it presents for comparison two areas which can be observed and compared strictly from the point of view of their brightness so as to arrive at an accurate determination of the oxyhemoglobin content, the light transmitted to the eye of the observer being restricted to those portions of the spectrum in which the spectral curve of the oxyhemoglobin does not substantially deviate from the spectral curve of the standard employed in the instrument.

While I have illustrated and described details of an instrument which has been found advantageous as an embodiment of my invention, it will be understood that my invention may be otherwise embodied and practiced within the scope of the following claims.

Having described my invention, I claim:

1. An instrument for determining the concentration of hemoglobin in the blood comprising a specimen holder for supporting a layer of oxyhemoglobin of predetermined thickness and an adjustable optical wedge arranged for simultaneous observation of their comparative brightness through viewing means, said wedge being formed of cobalt glass having an absorption curve in the central portion of the visible spectrum which approximates the absorption curve of oxyhemoglobin, and said viewing means being provided with a filter for substantially absorbing from the light used in said viewing means the portions of the visible spectrum shorter than about 500 to 510 millimicrons and longer than about 550 to 570 millimicrons.

2. An instrument for determining the concentration of hemoglobin in the blood comprising viewing means, and a specimen holder for supporting a layer of oxyhemoglobin of predetermined thickness and a standard mounted in adjacent relation in the field of view of said viewing means, said standard being formed of cobalt glass having a spectral curve characterized by a minimum of transmission at about 540 millimicrons and a maximum of transmission at about 565 millimicrons, said viewing means being provided with a filter substantially absorbing the portions of the visible spectrum shorter than about 500 to 510 millimicrons and longer than about 550 to 570 millimicrons.

3. An instrument for determining the concentration of hemoglobin in the blood comprising viewing means, a specimen holder for supporting oxyhemoglobin in a layer of predetermined thickness and a standard optical member mounted in adjacent relation in the field of view of said viewing means, said standard being formed of a glass having a spectral curve characterized by a relatively low transmission at about 540 millimicrons, a relatively high transmission at about 565 millimicrons and a transmission at about 510 millimicrons relatively higher than the transmission at 565 millimicrons, and a filter in said instrument substantially absorbing the portion of the visible spectrum shorter than about 500 to 510 millimicrons and substantially absorbing the portion of the visible spectrum longer than about 550 to 570 millimicrons.

4. An instrument for determining the concentration of hemoglobin in the blood comprising viewing means, a filter for filtering light before it reaches the operator's eye, a specimen holder for supporting a quantity of oxyhemoglobin of predetermined thickness in the light path in the instrument and an optical wedge mounted in adjacent relation thereto so that the specimen and wedge will both be in the field of view of said viewing means, said wedge being adjustable for positioning a selected portion thereof adjacent said specimen holder, said wedge being formed of cobalt glass possessing spectral transmission characteristics which in the central portion of the visible spectrum approximate the transmission characteristics of oxyhemoglobin in the same region, said filter substantially absorbing the portion of the visible spectrum of shorter wave lengths than about 500 to 510 millimicrons and absorbing the portions of the visible spectrum of longer wave lengths than about 550 to 570 millimicrons.

5. An instrument for determining the concentration of hemoglobin in the blood comprising viewing means, a filter for filtering light before it reaches the operator's eye, a specimen holder for supporting a quantity of oxyhemoglobin of predetermined thickness in the light path in the instrument and an optical wedge mounted in adjacent relation thereto so that the specimen and wedge will both be in the field of view of said viewing means, said wedge being adjustable for positioning a selected portion thereof adjacent said specimen holder, said wedge being formed of uranium glass possessing spectral transmission characteristics which in the central portion of the visible spectrum approximate the transmission characteristics of oxyhemoglobin in the same region, said filter substantially absorbing the portion of the visible spectrum of shorter wave lengths than about 500 to 510 millimicrons and absorbing the portions of the portions of the visible spectrum of longer wave lengths than about 550 to 570 millimicrons.

6. An instrument for determining the concentration of hemoglobin in the blood comprising a specimen holder for supporting oxyhemoglobin of predetermined thickness in the optical path of the instrument, means for viewing the brightness of the specimen, a light filter for filtering the light before reaching the observer's eye, and a standard optical member mounted in adjacent relation to said specimen holder so that said specimen and optical member may both be viewed by said viewing means, said standard being formed of a glass having a spectral transmission curve characterized by a relatively low transmission at about 540 millimicrons, a relatively high transmission at about 565 millimicrons and a transmission at about 510 millimicrons at least as high as the transmission at about 565 millimicrons, said filter substantially absorbing the portion of the visible spectrum of shorter wave lengths than about 500 to 510 millimicrons and absorbing the portion of the visible spectrum of longer wave lengths than about 550 to 570 millimicrons.

7. An instrument for determining the concentration of hemoglobin in the blood comprising a source of illumination, a specimen holder for supporting oxyhemoglobin in a predetermined substantially uniform thickness in the path of light emanating from said source, a standard optical member mounted in side by side relation to said specimen holder and also in said path of light emanating from said source, a viewing station located so as to receive the light from said source and transmitted by the specimen in the specimen holder and by said standard, said specimen having a spectral transmission curve with a characteristic shape in that portion lying between approximately 510 and 580 millimicrons, said standard having a spectral transmission curve with the portion between approximately 510 and 580 millimicrons simulating the shape of the corresponding portion of the spectral transmission curve of the specimen, and a filter positioned between said source and said viewing station and having characteristics for absorbing substantially all of the spectral transmission curve lying below 510 millimicrons and lying above 580 millimicrons.

8. An instrument for use in determining the concentration of hemoglobin in blood comprising viewing means, a specimen holder for supporting hemoglobin in a layer of predetermined thickness and a standard optical means disposed in adjacent relation in the field of view of said viewing means, said standard being in the form of a light transmitting optical wedge having a spectral curve characterized by a relatively low transmission at about 540 millimicrons, a relatively high transmission at about 565 millimicrons and a transmission at about 510 millimicrons relatively higher than the transmission at 565 millimicrons, and a filter in said instrument substantially absorbing the portion of the visible spectrum shorter than about 500 to 510 millimicrons and substantially absorbing the portion of the visible spectrum longer than about 550 to 570 millimicrons.

MORDEN G. BROWN.

REFERENCES CITED

The following references are of record in the file of this patent:

UNITED STATES PATENTS

| Number | Name | Date |
| --- | --- | --- |
| 2,355,960 | Duffie | Aug. 15, 1944 |

OTHER REFERENCES

"Colorimetric Apparatus", published in 1932 by Bausch and Lomb Optical Company, Rochester, New York, pages 23 to 25 cited.